United States Patent [19]
Scott

[11] Patent Number: 5,394,392
[45] Date of Patent: Feb. 28, 1995

[54] METHOD FOR TRANSFERRING INFORMATION USING MODEMS

[75] Inventor: Robert E. Scott, Indian Rocks Beach, Fla.

[73] Assignee: AT&T Corp., Murray Hill, N.J.

[21] Appl. No.: 990,159

[22] Filed: Dec. 14, 1992

[51] Int. Cl.$^6$ .............................................. H04B 1/38
[52] U.S. Cl. ......................................... 370/24; 370/32; 375/222; 379/93; 379/406
[58] Field of Search ................ 379/93, 406, 410; 375/8, 121; 370/32, 32.1, 24, 27, 32, 29

[56] References Cited

U.S. PATENT DOCUMENTS

| | | | |
|---|---|---|---|
| 3,906,166 | 9/1975 | Cooper et al. | 379/59 X |
| 4,335,464 | 6/1982 | Armstrong et al. | 375/43 |
| 4,811,357 | 3/1989 | Betts et al. | 375/1 |
| 4,823,339 | 4/1989 | Bigo et al. | 370/32.1 |
| 4,860,341 | 8/1989 | D'Avello et al. | 379/91 |
| 4,890,316 | 12/1989 | Walsh et al. | 379/98 |
| 4,969,145 | 11/1990 | Maruyama et al. | 370/32.1 |
| 4,972,436 | 11/1990 | Halim et al. | 375/28 |
| 5,007,047 | 4/1991 | Sridhar et al. | 370/32.1 |
| 5,008,901 | 4/1991 | Wallach et al. | 375/8 |
| 5,099,478 | 3/1992 | Bremer et al. | 370/100.1 |
| 5,289,459 | 2/1994 | Brownlie | 370/24 X |

OTHER PUBLICATIONS

Millicom, "Cellular Portable Telephone" sales brochure Nov. 21, 1984.

*Primary Examiner*—James L. Dwyer
*Assistant Examiner*—Paul A. Fournier
*Attorney, Agent, or Firm*—Christopher N. Malvone

[57] ABSTRACT

A modem's data reception rate is increased by decreasing the amplitude of the signals transmitted by the modem. Decreasing the amplitude of the transmitted signals reduces the amplitude of the resulting echoes, and thereby reduces the residual echoes that remain after echo cancellation. Reducing the residual echoes permits increasing the data reception rate. Decreasing the amplitude of the transmitted signals also involves decreasing the data transmission rate; however, asymmetrical data transfer rates are acceptable for many modem applications.

8 Claims, 5 Drawing Sheets

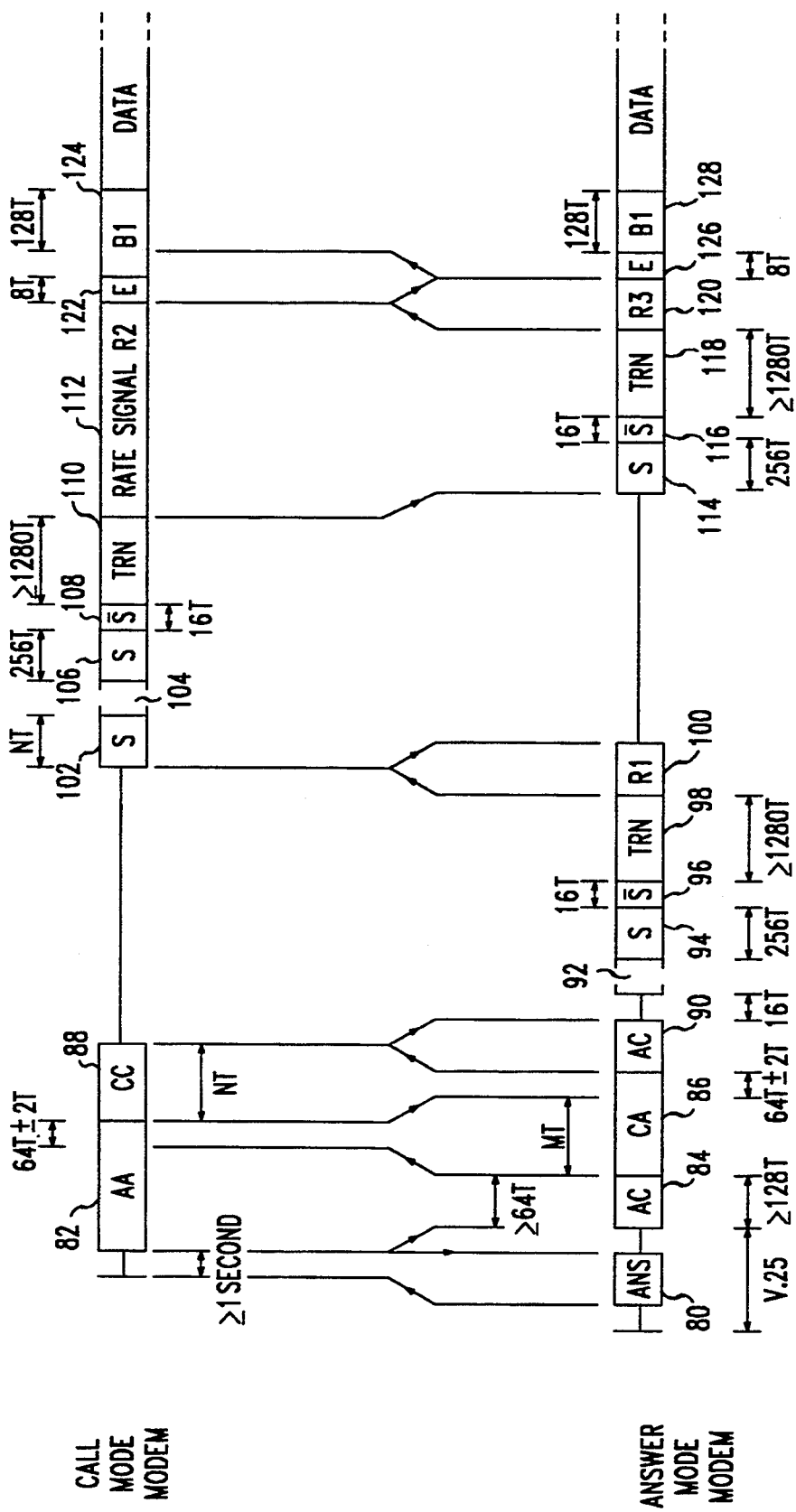

RATE NEGOTIATION INITIATED
BY THE CALLING MODEM

RATE NEGOTIATION INITIATED
BY THE ANSWERING MODEM

METHOD FOR TRANSFERRING INFORMATION USING MODEMS

BACKGROUND OF THE INVENTION

1. Field of the Invention

The present invention relates to communications, more particularly to modem communications.

2. Description of the Prior Art

Modems communicate over channels such as telephone lines. These channels suffer from channel impairments such as echoes that are created by impedance mismatches. When modems operate in full duplex mode, echoes of the modem's transmitted signal interfere with the signal to be received.

One approach to alleviating this problem is to use frequency division multiplexing. Frequency division multiplexing decreases the channel impairment related to echoes, by transmitting signals in one portion of the communication channel's bandwidth and receiving signals in another portion of the communication channel's bandwidth. The echo is removed from the received signal by simply filtering in the frequency domain. U.S. Pat. No. 4,890,316 entitled "Modem for Communicating At High Speed Over Voice-Grade Telephone Circuits" discloses such a technique. Unfortunately, this technique reduces transmission speed because the modems cannot use the entire bandwidth of the communication channel for both transmitting and receiving signals.

Another approach to reducing the effect of echoes is to use a modem that cancels echoes. U.S. Pat. No. 5,007,047 entitled "Adaptive Rate Control for Echo Cancelling Modem" discloses such a technique. This technique offers the advantage of using the entire communication bandwidth for both transmitting and receiving; however, it is limited by a modem's ability to cancel echoes. After cancelling an echo, the remaining residual echo interferes with the modem's ability to receive signals and thereby limits high speed data reception.

SUMMARY OF THE INVENTION

The present invention reduces the amplitude of echoes that are produced when a modem transmits by transmitting at a lower average signal level. Reducing the amplitudes of echoes, reduces the amplitudes of residual echoes that remain after echo cancellation, and thereby permits higher data reception rates. Transmitting at a lower average signal level often requires reducing the transmit rate because the lower signal level reduces noise immunity, and thereby may reduce the rate at which a remote modem can receive the transmitted data. Reducing a modem's transmit rate in order to enhance its reception rate is compatible with typical modem applications since modem communications often involve large amounts of data being transmitted in one direction while relatively little data is transmitted in the opposite direction.

One embodiment of the invention comprises a method for transferring information over a communication channel by using a modem to transmit symbols with a first average signal level, and to receive symbols from a remote modem that transmits symbols with a second average signal level where the second average signal level is substantially higher than the first average signal level.

Another embodiment of the present invention comprises transmitting information using symbols belonging to a constellation of symbols that has less symbols than a constellation of symbols used for receiving information.

Yet another embodiment of the invention comprises monitoring a backlog of information being transmitted and if the backlog crosses a threshold, changing the first and second average signal levels so that the first average signal level is substantially higher than the second average signal level.

In still another embodiment of the present invention, a measurement of channel impairment is used to determine the average signal levels.

BRIEF DESCRIPTION OF THE DRAWING

FIG. 7 illustrates a start-up procedure;

DETAILED DESCRIPTION

Figure 1:
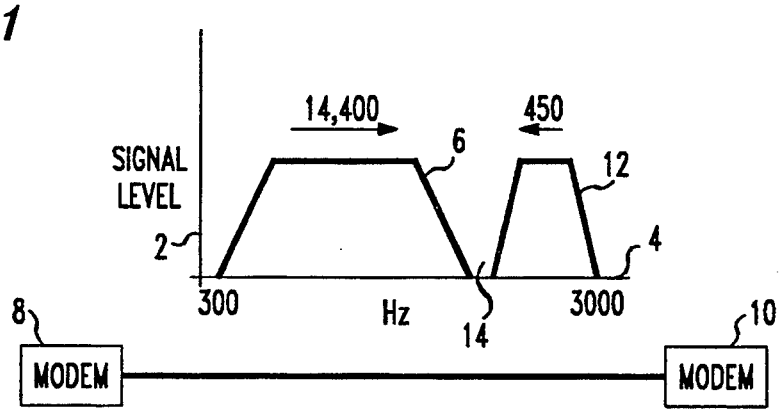
FIG. 1 illustrates communication channel bandwidths and signal levels used by frequency division multiplexing modems with asymmetrical rates.

FIG. 1 illustrates channel bandwidths and signal levels used in asymmetrical frequency division multiplexed (FDM) modem communications. Axis 2 indicates average signal level and axis 4 indicates bandwidth in hertz. Curve 6 illustrates the bandwidth and average signal allocated for transferring data from modem 8 to modem 10, and curve 12 indicates the bandwidth and average signal for transmitting data from modem 10 to modem 8. Both curves show the same average signal level; however, curve 6 indicates a wider bandwidth which permits a higher data transmission rate such as 14,400 bits per second (bps), and curve 12 indicates a narrower bandwidth which may require a lower transmission rate such as 450 bps. This arrangement is considered asymmetrical because a higher transmission rate is used in one direction while a lower transmission rate is used in the opposite direction. Guard band 14 is used to separate curves 6 and 12; this portion of the channel's bandwidth is not used to transfer data.

Figure 2:
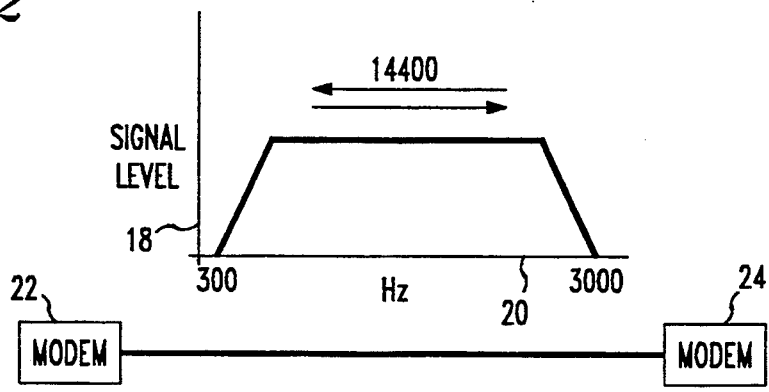
FIG. 2 illustrates communication channel bandwidths and signal levels used by echo cancelling modems.

FIG. 2 illustrates a bandwidth allocation and average signal level used when communicating between echo cancelling modems. Axis 18 indicates average signal level and axis 20 indicates bandwidth in hertz. Transmissions from modem 22 to modem 24, and transmissions from modem 24 to modem 22, share the same bandwidth and transmit at the same average signal level. This type of arrangement produces a transmission rate of approximately 14,400 bps in both directions.

Figure 3:
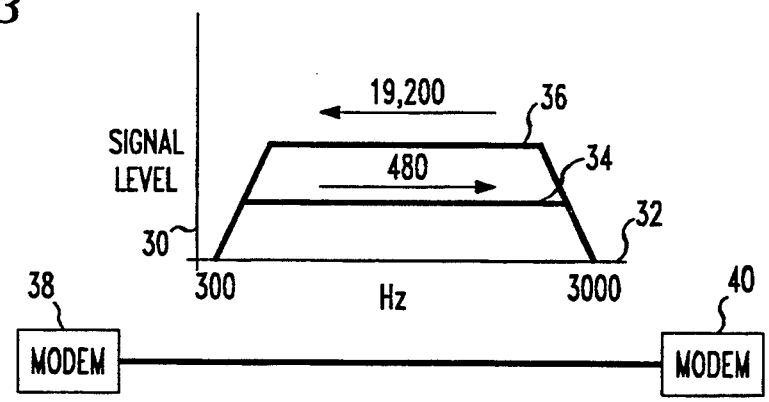
FIG. 3 illustrates communication channel bandwidths and signal levels used by one embodiment of the present invention.

FIG. 3 illustrates channel bandwidths and average signal levels used in one embodiment of the present invention. Axis 30 indicates average signal level and axis 32 indicates allocated bandwidth in hertz. Curve 34 indicates the bandwidth and average signal level for transmission from echo cancelling modem 38 to echo cancelling modem 40, and curve 36 indicates the bandwidth and average signal level for transmission from modem 40 to modem 38. (In this example, the legs of curve 34 are overlapped by the lower portion of the legs of curve 36.) Both directions share the same channel bandwidth; however, one direction transmits at a higher average signal level than the other direction. The direction with the higher average signal level (modem 40 to modem 38) can have a data rate such as 19,200 bps, and the direction with the lower average signal level (modem 38 to modem 40) can have a data rate such as 480 bps.

In comparison to FIG. 1, the present invention provides higher transmission rates in both directions. This results from using the entire channel bandwidth for transmission in both directions.

In comparison to FIG. 2, the present invention achieves a higher data rate in one direction and a lower data rate in the opposite direction. These asymmetrical transmission rates are acceptable in most applications because large amounts of data are typically transferred in one direction while much less data is transmitted in the opposite direction. When necessary, the arrangement of FIG. 3 can be reversed to permit high speed transmission from modem 38 to modem 40, and lower speed transmission from modem 40 to modem 38.

The communication channel between modems 38 and 40 may include a telephone communication line with two or four wires. The communication channel may also comprise a telephone network, wire, cables, optical fibers or electromagnetic waves transmitted through the air.

One or both of the modems may be replaced with other communication devices that transmit and receive analog signals that are in electrical or optical form, or digital signals that are in electrical or optical form. The analog signals may include, for example, QAM (Quadrature Amplitude Modulation) signals, PSK (Phase Shift Keying) signals or FSK (Frequency Shift Keying) signals. The digital signals may include, for example, PCM (Pulse Code Modulation) signals.

In reference to FIG. 3, modem 38 transmits at a lower average signal level. Transmitting at a lower average signal level reduces the amplitudes of echoes received by modem 38 and permits modem 38 to receive data at a higher rate. As an additional consequence of modem 38 transmitting at a lower average signal level, modem 40 will receive data at a reduced rate; therefore, modem 38 transmits to modem 40 at a lower rate than modem 40 transmits to modem 38.

The signal-to-noise ratio of a received signal is a function of channel impairment. Channel impairment or channel noise is composed of signal distortion, idle noise and residual echo. Reducing the amplitudes of signals transmitted by modem 38 reduces the amplitudes of the echoes received by modem 38. Echoes with reduced amplitudes produce residual echoes with reduced amplitudes. Decreasing the residual echo component of the channel noise effectively increases the signal-to-noise ratio. An increased signal-to-noise ratio permits the use of a symbol constellation with a larger number of symbols when transmitting data from modem 40 to modem 38. The larger number of symbols in the constellation results in a higher bit rate or information transfer rate from modem 40 to modem 38.

Figure 4:
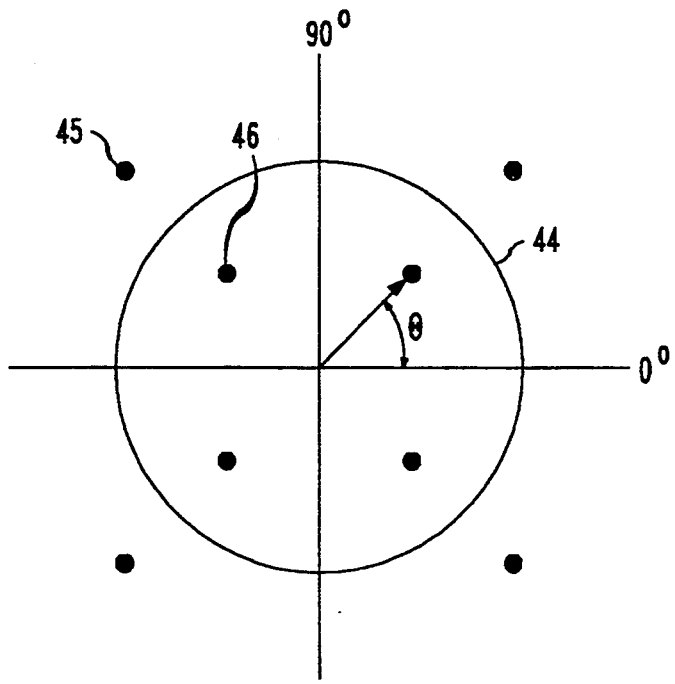
FIG. 4 illustrates a symbol constellation with a higher average signal level.

FIG. 4 illustrates an eight point symbol constellation with an average signal level indicated by the radius of circle 44. A symbol's amplitude and phase are indicated by a vector drawn between the origin and the symbol. The vector's length indicates the symbol's amplitude, and the angle between the vector and the zero degree axis indicates the symbol's phase. The spacing between the symbols illustrates the amount of noise that would be required to incorrectly identify a symbol. For example, a large amount of noise would be required to incorrectly identify transmitted symbol 45 as symbol 46. Since the noise seen by modem 38 has been reduced by reducing the amplitudes of the echoes, a large intersymbol space is not required and a symbol constellation that has more symbols may be received by modem 38. Using a constellation with more symbols results in a higher bit rate from modem 40 to modem 38.

Figure 5:
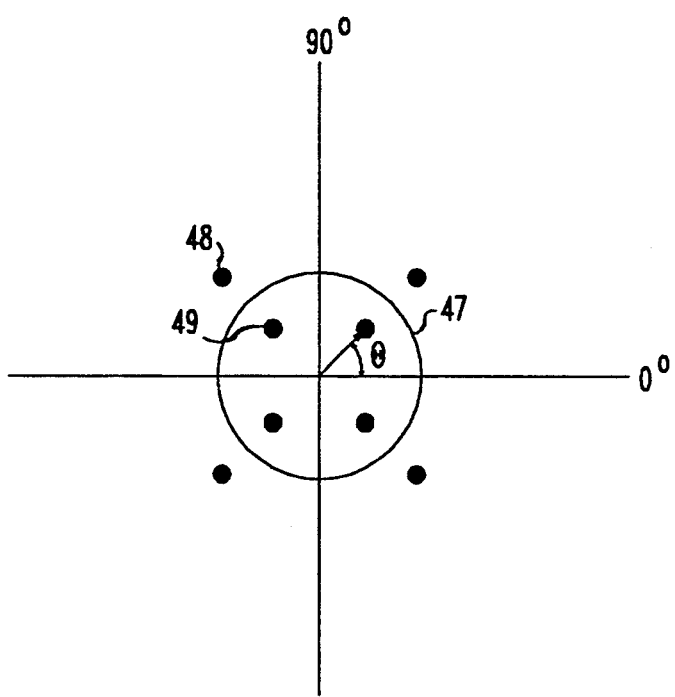
FIG. 5 illustrates a symbol constellation with a lower average signal level.

FIG. 5 illustrates the symbol constellation of FIG. 4 with a lower average signal level indicated by the smaller radius of circle 47. Because of the lower average signal level, the symbols in the constellation of FIG. 5 are clustered closer together. As a result, a relatively small amount of noise can result in transmitted symbol 48 being incorrectly identified at the receiving modem as symbol 49. Since a small amount of noise could result in modem 40 incorrectly identifying a symbol, a larger amount of intersymbol space is required and a constellation that has less symbols should be transmitted by modem 38 to modem 40. Using a constellation with less symbols results in a lower bit rate from modem 40 to modem 38.

Figure 6:
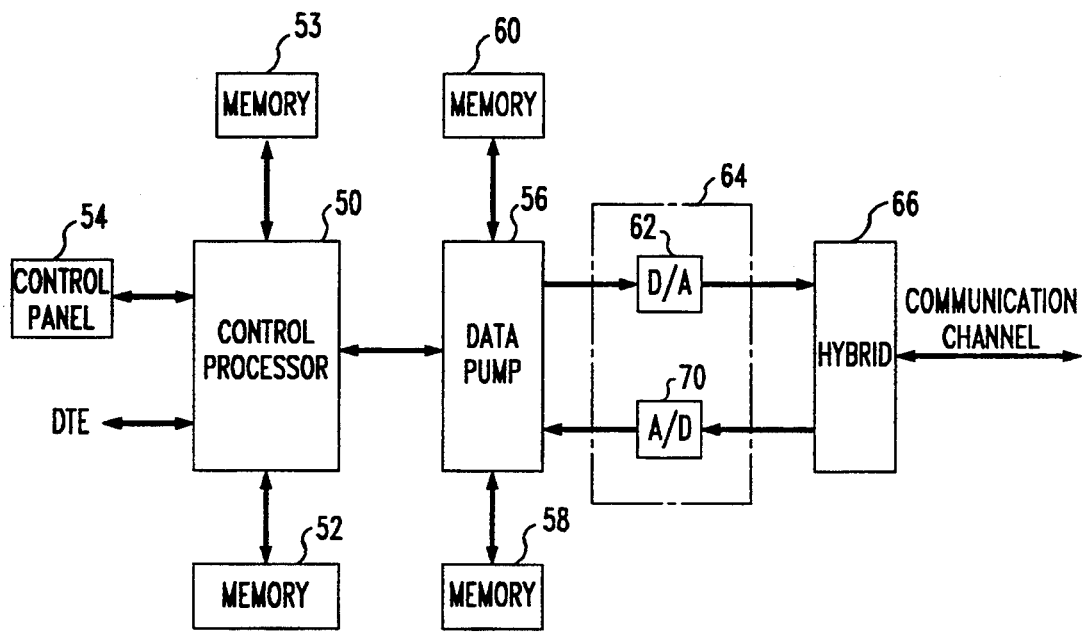
FIG. 6 is a block diagram of a typical echo cancelling modem.

Echo cancelling modems are well known in the art and FIG. 6 is a block diagram of a typical echo cancelling modem. Control processor 50 accepts data to be transmitted from the data terminal equipment (DE) and provides received data to the DTE. Control processor 50 can be any of the widely available microprocessors or microcomputers. The DTE communicates with control processor 50 over an RS232 interface that can be either synchronous or asynchronous. It is also possible to use any other interface such as an interface that is compatible with a personal computer's internal data bus. Memory 52 serves as a program memory, and memory 53 serves as a data buffer and a scratch pad memory for processor 50. Control panel 54 provides instructions to processor 50. Control processor 50 performs functions such as data buffering, data compression/decompression, and error detection and retransmission.

When the amount of data comprising a backlog in memory 53 crosses a threshold, the data transmission rate can be increased and a corresponding decrease may be made in the data reception rate. This is accomplished by increasing the average signal level of the transmitted symbols and by initiating a rate renegotiation with the remote modem. It is also possible to reverse the situation of FIG. 3 so that modem 38 transmits at a higher rate while modem 40 transmits at a lower rate. Modem 38 can initiate this reversal by transmitting an answer tone to modem 40 and by following a start-up procedure.

The threshold that determines when the backlog in memory 53 requires a change in data transmission rates can be a fixed number, or it can be dependent on the present transmission rate, the present reception rate from the DTE, the present channel impairment, the size of memory 53 or a combination of these factors.

Control processor 50 provides the data to be transmitted to data pump 56 and accepts received data from data pump 56. Data pump 56 can be any general purpose digital signal processing device such as a Texas Instrument TMS32020 digital signal processor or an AT&T Microelectronics DSP16A digital signal processor. Data pump 56 performs functions such as scrambling the data, trellis encoding, differential encoding, echo cancelling and converting the bit stream to a digital representation of the symbols in the symbol constellation being used at the time. Additionally, data pump 56 converts received information from a digital representation of a symbol to a bit stream, and performs the appropriate decoding including Viterbi decoding. The encoding and decoding are performed in accordance with standards such as V.22bis, V.32, V.32bis that are promulgated by standards organizations such as the CCITT (International Telegraph and Telephone Consultative Committee) group of the International Telecommunications Union (ITU). Other common standards are Bell defacto standards such as the Bell 212A. Data pump 56 also sets the average signal level of the transmitted symbols. When the average transmit signal level is low, the echoes resulting from the transmitted signals are minimized so that the residual echoes are reduced and data reception is enhanced. Data pump 56 uses memory 58 as a program memory, and it uses memory 60 to store echo cancelling coefficients and equalizer coefficients.

D/A 62 of CODEC 64 converts the digital representation of a symbol received from data pump 56 into an analog signal that represents a symbol. The digital representation of a symbol is converted to an analog representation of the signal using well-known carrier modulation techniques such as QAM, PSK, or FSK. A CODEC is a device that comprises an A/D and D/A in one package and is well known in the art. Devices such as an AT&T Microelectronics T7525 CODEC perform this function.

Hybrid 66 transfers the analog representation of the symbol onto a communication channel such as a telephone communication line with two or four wires, or a communication channel comprising wires, cables, optical fibers or electromagnetic waves transmitted through the air. A remote modem then receives the information at the far end of the communication channel. Hybrid 66 also receives symbols from the communication channel and transfers them to A/D 70 of CODEC 64. Many implementations of Hybrid 66 are well known in the art.

A/D 70 of CODEC 64 converts the analog representation of a symbol into a digital representation of a symbol. The digital representation of a symbol is sent to data pump 56 where the symbol is converted into a bit stream that is decoded in accordance with the above mentioned standards. Data pump 56 uses an estimate of the echo to remove the echo from the received symbol. The estimate of the echo is not perfect, and when combined with the received symbol leaves a residual echo in the received symbol. The present invention minimizes the effect of this residual echo by transmitting at a lower average signal level. The decoded bit stream from data pump 56 is provided to control processor 50 where error detection and retransmission are performed, and if necessary, the data is decompressed. Data from control processor 50 is then passed to the DTE.

Data pump 56 is trained during initial contact between modems 38 and 40. This training can be carded out using half duplex and/or full duplex training. These training procedures are well-known in the art and are specified in the V.32 and V.32bis standards mentioned earlier. During training, the data pump determines the amount of echo present, the idle noise and signal distortion introduced by the communication channel. This information is used to determine both average signal levels, symbol constellations, echo cancelling coefficients, equalizer coefficients and transmission rates used when data transmission begins. Usually, the higher average signal level should be equal to a level specified by one of the above mentioned standards. The lower average signal may be a fixed level which is much lower than the higher level, for example, 24 dB lower. It is also possible to base the lower average signal level on the channel impairment detected during training. For example, if there is a large amount of channel impairment, the lower average signal level should be larger and if there is a small amount of impairment, the lower average signal level may be smaller. It is also possible to vary both or one of the average signal levels based on the amount of data comprising the backlog in memory 53.

In some applications, there may be a limit on how low the average signal level can be set. A steady tone can be added to the transmitted signal and then subtracted by the remote modem. The steady tone will raise the transmitted signal level to a point that will satisfy the requirements imposed by a telephone network while having minimal impact on echo cancelling. Since the tone is constant, it is predictable and easily removed by the receiving modem.

FIG. 7 illustrates the start-up procedures specified by standard V.32bis. A start-up procedure used by the present invention is similar to the V.32bis standard. "T" represents a symbol interval or period, and is approximately 1/2400 seconds for V.32bis modems. The sequence begins when the call modem receives an answer tone 80 that is at least one second in duration from the answer modem. The form of the answer tone is specified by standard V.25. In response to the answer tone, the call modem begins to repetitively transmit carder state A as illustrated by segment 82. When state A is detected by the answer modem, it stops transmitting answer tone and begins to repetitively transmit carrier states AC as indicated by segment 84. Carrier states A and C are specified by the V.32bis standard. The answer modem will transmit states AC for an even number of symbol intervals that are greater than or equal to 128 and until carrier state A from the call modem has been detected for at least 64 symbol intervals. At that point, the answer modem initiates a phase reversal and begins to repetitively transmit carrier states CA for an even number of symbol intervals as indicated in segment 86. Additionally, the answer modem starts a counter at the time it begins transmitting states CA. This counter is used to measure round trip time MT. When the call modem detects the phase reversal from AC to CA, it waits 64±2 symbol intervals and then begins to repetitively transmit carrier state C as indicated by segment 88; it also starts a counter to measure round trip transmission time NT. When the answer modem detects the phase reversal from A to C, it stops the counter that was measuring round trip time MT and waits for a time that is equal to 64±2 symbol intervals. At the end of this delay, the answer modem initiates a phase reversal and begins transmitting carrier states AC in a repetitive fashion as indicated by segment 90. When the call modem detects the phase reversal created when the answer modem began transmitting states AC, the call modem stops the counter that was measuring round trip delay time NT and stops transmitting. When the answer modem detects a drop in the incoming tone due to the call modem ending its transmission, the answer modem ceases transmitting for 16 symbol intervals. Segments 80 to 90 are transmitted at the higher average signal level by both modems to provide compatibility with current V.32bis modems.

The first training sequence is carried out by the answer modem. The answer modem transmits the first training sequence at the higher average signal level, and at this point it is assumed that the answering modem will have the high speed transmit direction. (It is also possible to start off with the assumption that the call modem will have the high speed transmit direction.) After the answer modem waits for 16 symbol intervals, it may transmit an optional special echo canceller training sequence during segment 92 as specified by V.32bis. Normally after waiting for 16 symbol intervals, the answer modem transmits an S sequence for 256 symbol intervals during segment 94, and then transmits the S̄ sequence for 16 symbol intervals during segment 96. These sequences are specified in standard V.32bis. After the S̄ sequence, a TRN sequence is transmitted for at least 1280 symbol intervals; however, the TRN transmission should not exceed 8192 symbol intervals. This sequence is also specified by the V.32bis standard. The sequences transmitted during periods 94, 96 and 98 are used to produce the equalizer coefficients of the calling modem and the echo cancelling coefficients of the answering modem. After transmitting sequence TRN during segment 98, the answer modem transmits rate signal R1 during segment 100. To provide compatibility with V.32 and V.32bis modems, rate signal R1 is specified by standard V.32bis except that the present invention uses one of the spare bits as an "asymmetrical" bit to indicate that the modem supports asymmetrical communication.

In response to receiving the R1 sequence, the call modem monitors the asymmetrical bit. If the bit is not set, the call modem continues in V.32bis mode, and if the bit is set, the call modem transmits at the lower average signal level and begins transmitting sequence S for a period of NT as previously measured by the call modem's counter. The answer modem ceases transmission after detecting the S sequence from the call modem. After transmitting the initial S sequence for a period of NT as shown in segment 102, the call modem may transmit an optional special echo canceller training sequence during segment 104 as specified by V.32bis. Normally, after transmitting the initial S sequence, the call modem transmits the sequence S for 256 symbol intervals during segment 106. After completing the transmission of segment 106, the call modem transmits sequence S̄ for 16 symbol periods during segment 108. After transmitting the sequence S̄, the call modem transmits the TRN sequence for at least 1280 symbol periods during segment 110. The TRN transmission should not exceed 8192 symbol periods. These sequences are used to produce the equalizer coefficients of the answering modem and the echo cancelling coefficients of the call modem. During segment 112 the call modem transmits rate signal R2 which indicates the highest rate at which it can receive data, and it also sets an asymmetrical bit to indicate that it is capable of asymmetrical communication. Signal R2 is specified in the V.32bis standard except that a spare bit is used to indicate an asymmetrical communication capability. If either modem does not set the asymmetrical bit, it is assumed that symmetrical transmission will occur and the V.32bis standard is followed with both modems transmitting at the higher average signal level. When the asymmetrical bit is set, rate signal bits B5, B6, B9 and B10 represent a multiplier. The high speed direction bit rate is equal to 2400 or the current symbol rate multiplied by the multiplier. Additionally, it is assumed that all lower bit rates are also available. It is also possible to add bits or use spare bits within the specified rate signal to indicate higher transmit rates than are currently specified by V.32bis.

When the answer modem detects rate signal R2, it transmits at the higher average signal level. The answer modem transmits sequence S for 256 symbol intervals during period 114, segment S̄ for 16 symbol intervals during segment 116, and sequence TRN for at least 1280 symbol periods during segment 118. The TRN sequence should not be transmitted for more than 8192 symbol periods. After transmitting the TRN segment, the answer modem transmits rate signal R3 during segment 120. Rate signal R3 specifies the highest common rate between rate signal R2 and the transmit capabilities of the answer modem; the rate in signal R3 specifies the high speed communication rate. Rate signal R3 specifies the communication rate in the same manner that signal R2 specified its rate. The low speed transmission rate is assumed to be 480 bps. This rate is adequate for the most common uses of the low speed channel because it allows the DTE to echo typed characters and it permits transmitting responses such as acknowledge/negative acknowledge (ack/nak). It is also possible to use another set of rate signals which allows the modems to agree on another low speed communication rate. When the call modem detects rate signal R3, it begins transmitting sequence E for 8 symbol periods during segment 122. Sequence E is specified in the V.32bis standard. After transmitting sequence E during segment 122, the call modem begins transmitting sequence B1 during segment 124. Sequence B1 is specified in the V.32bis standard. When the answer modem detects the E sequence transmitted by the call modem, it transmits an E sequence for 8 symbol periods during segment 126. When the call modem detects sequence E from the answer modem, it continues to transmit sequence B1 for another 128 symbol periods. The call modem is ready to transmit and receive data after transmitting sequence B1. After transmitting sequence E during segment 126, the answer modem transmits sequence B1 during segment 128 for 128 symbol periods. The answer modem is also ready to transmit and receive data after transmitting sequence B1.

When the quality of the communication channel between the modems varies, it is sometimes necessary to retrain the modems to establish new data rates, and improved echo cancelling and signal reception. If the call modem initiates a retrain, it will do so by transmitting a sequence AA at a lower average signal level, and if the answer modem initiates the retrain, it will transmit the sequence AC at a higher average signal level. The rest of the sequence follows as specified above with regard to FIG. 6, beginning with segments 82 and 84.

As mentioned earlier, sometimes it may be necessary to change the direction of the high speed channel. This can be done by performing a new start-up procedure which is initiated by the low speed transmitter transmitting an answer tone and effectively becoming the answer modem which is assumed to be the high speed transmitter. The rest of the sequence then follows the start-up procedure that was discussed with regard to FIG. 6.

Figure 8:
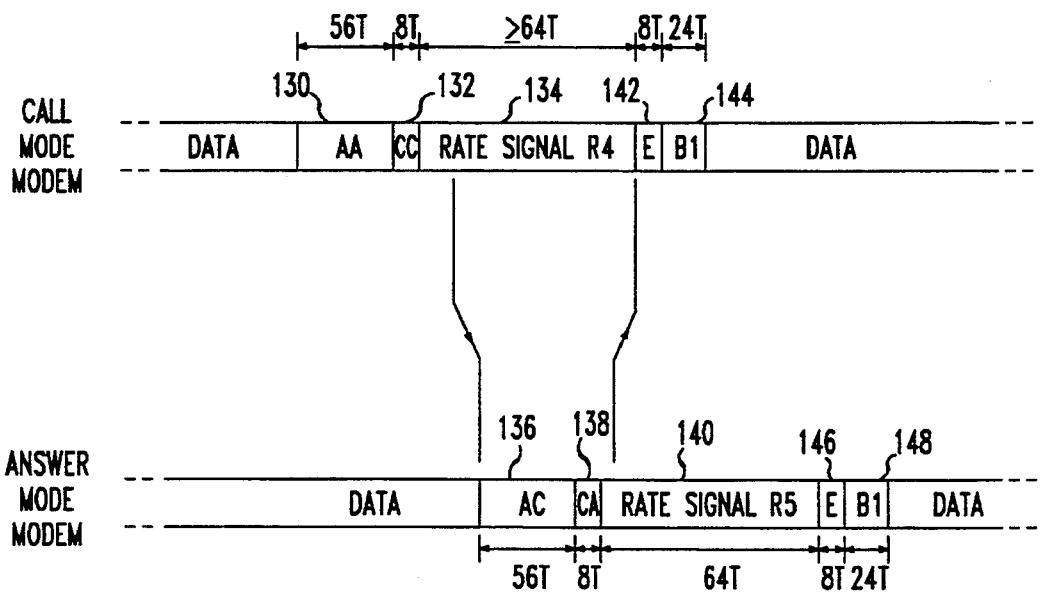
FIG. 8 illustrates a rate renegotiation initiated by a calling modem.

Sometimes it may be necessary to renegotiate the high speed transmission rate because changing communication channel conditions affect the high speed receiver's ability to receive data. The high speed receiving modem (the call modem) transmits a renegotiate request using a lower average signal level and the answer modem responds using a higher average signal level. FIG. 8 illustrates a rate renegotiation initiated by the calling modem. The sequences and signals are specified in the V.32bis standard. The rate signals indicate the communication rate in the same manner that signal R2 specified its rate. The calling modem initiates by sending sequence AA for 56 symbol periods during segment 130 and it follows that by sequence CC for 8 symbol periods during segment 132. It then transmits rate signal R4 for at least 64 symbol periods during segment 134; this signal specifies the highest available receive rate. In response to receiving rate signal R4, the answering modem transmits sequence AC for 56 symbol periods during segment 136 and sequence CA for 8 symbol periods during segment 138. The answering modem then transmits rate signal R5 for 64 symbol periods during segment 140; rate R5 specifies the highest available transmit rate. In response to rate signal R5 the call modem transmits sequence E for 8 symbol periods during segment 142 and sequence B1 for 24 symbol periods during segment 144. After segment 144, the call modem is ready to receive at the new rate. After the answer modem transmits rate signal R5 during segment 140, it then transmits sequence E for 8 symbol periods during segment 146 and sequence B1 for 24 symbol periods during segment 148. After segment 148, the answer modem is ready to transmit at the new rate. The new high speed transmission rate is the highest common rate between rate signals R4 and R5. The low speed transmission rate is assumed to be 480 bps. It is also possible to use another set of rate signals which allows the modems to agree on another low speed communication rate.

Figure 9:
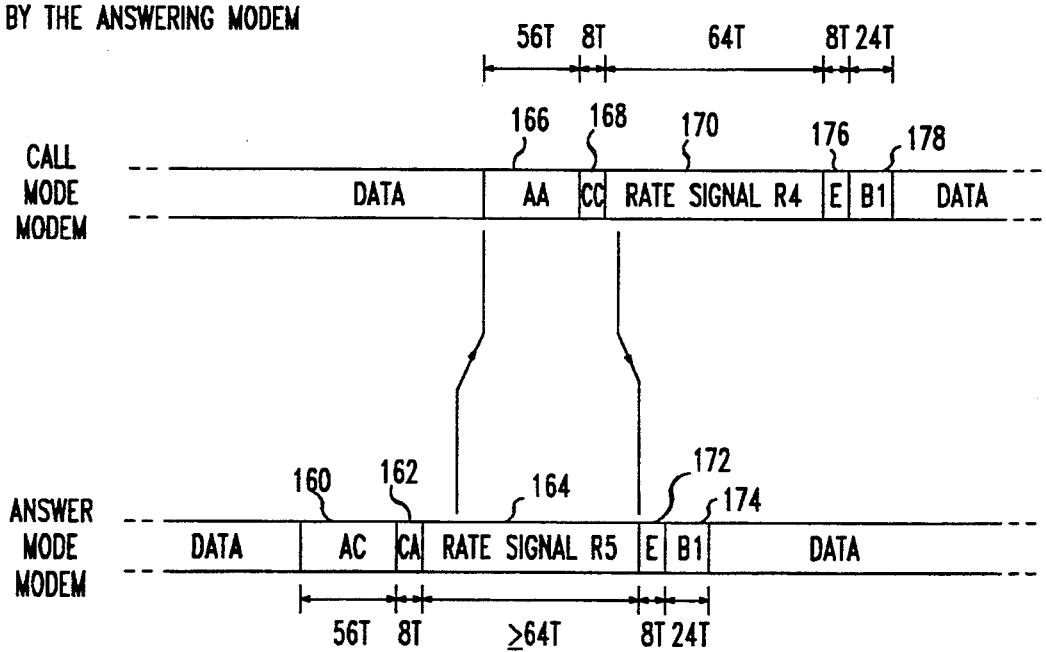
FIG. 9 illustrates a rate renegotiation initiated by an answering modem.

It is also possible for the answer modem, which is receiving at a low rate, to initiate a renegotiation. The answer modem transmits a renegotiation request using a higher average signal level and the call modem responds using a lower average signal level. FIG. 9 illustrates a rate renegotiation initiated by the answer modem. In this situation, the answer modem initiates by transmitting sequence AC for 56 symbol periods during segment 160. The AC sequence is followed by the CA sequence for 8 symbol periods during segment 162 and rate signal R5 for at least 64 symbol periods during segment 164. Rate signal R5 specifies the highest available transmit rate. In response to receiving rate signal R5, the call modem transmits sequence AA for 56 symbol periods during segment 166 and sequence CC for 8 symbol periods during segment 168. After transmitting sequence CC, the call modem transmits rate signal R4 for 64 symbol periods during segment 170. Rate signal R4 specifies the highest available receive rate. In response to receiving rate signal R4, the answer modem transmits sequence E for 8 symbol periods during segment 172 and sequence B1 for 24 symbol periods during segment 174. After transmitting the B1 sequence, the answer modem is ready to transmit and receive data at the new rates. After the call modem completes transmission of rate signal R4, it transmits sequence E for 8 symbol periods during segment 176 and sequence B1 for 24 symbol periods during segment 178. After transmitting sequence B1, the call modem is ready to transmit and receive data at the new rate. The new high speed transmission is the highest common rate between rate signals R4 and R5. The low speed transmission rate is assumed to be 480 bps. It is also possible to use another set of rate signals which allows the modems to agree on a another low speed communication rate.

The above techniques for initiating communication, retraining, changing the direction of the high speed communication, and rate renegotiation can be carried out by the use of other standards, modifications of other standards or by any other specified sequence of signals and steps. Any technique will work; however, both modems should use the same or compatible techniques.

Figure 10:
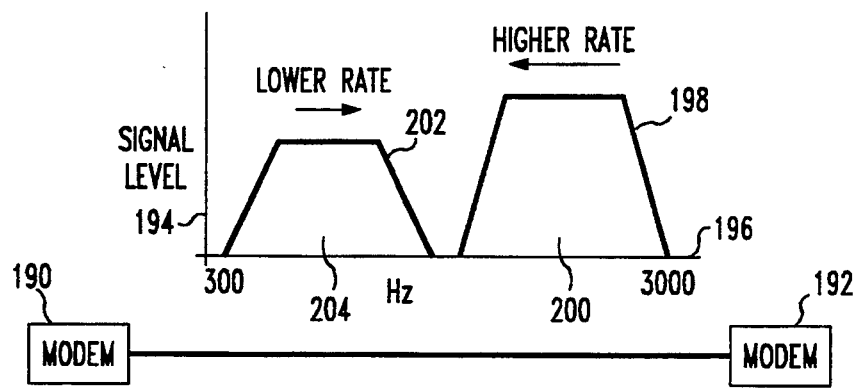
FIG. 10 illustrates communication channel bandwidths and signal levels used by another embodiment of the present invention.

In another embodiment of the present invention, the average signal levels of frequency division multiplexed modems are varied. FIG. 10 illustrates bandwidths and average signal levels used when communicating between frequency division multiplexing modems 190 and 192. In this example, modem 190 will receive data at a higher rate and transmit data at a lower rate, and modem 192 will transmit data at the higher rate and receive data at the lower rate. Axis 194 indicates average signal level and axis 196 indicates bandwidth in hertz. Curve 198 indicates the bandwidth and signal level of band 200 which is used to transmit information from modem 192 to modem 190, and curve 202 indicates the bandwidth and signal level of band 204 which is used to transmit information from modem 190 to modem 192. The curves show that modem 190 transmits at a lower average signal level than modem 192. Modem 190, which will receive a large amount of data, transmits at a lower average signal level to minimize the signal energy in band 204. As a result, there is less signal energy from band 204 in the stop band of modem 190's filter. This decreases the amount of residual signal energy that leaks through the filter, and thereby increases the signal-to-noise ratio seen by modem 190. The improved signal-to-noise ratio enables modem 190 to receive information at a higher rate. The procedures for start-up, retraining, high speed channel direction change and rate renegotiation are similar to the procedures described above.

Additionally, this technique lowers the cost of frequency division multiplexed modems. Decreasing the signal level of band 204 reduces the amount of energy that must be filtered out by the modem's filter. This reduces the performance requirements of the filter and permits the use of cheaper and less complex filters.

The communication channel between modems 190 and 192 may include a telephone communication line with two or four wires. The communication channel may also comprise a telephone network, wire, cables, optical fibers or electromagnetic waves transmitted through the air.

One or both of the modems may be replaced with other communication devices that transmit and receive analog signals that are in electrical or optical form, or digital signals that are in electrical or optical form. The analog signals may include, for example, QAM signals, PSK signals or FSK signals. The digital signals may include, for example, PCM signals.

I claim:

1. A method for transferring information between communication devices, over a communication channel having a near end and a far end, said method, comprising the steps of:

transmitting a first plurality of symbols from the near end of the communication channel to the far end of the communication channel with a first average signal level at the near end of the communication channel;

receiving a second plurality of symbols at the near end of the communication channel that are transmitted from the far end of the communication channel with a second average signal level at the far end of the communication channel, said second average signal level being substantially higher than said first average signal level;

using overlapping portions of the communications channel's bandwidth for transmitting and receiving symbols; and at least one of said communication devices monitoring a backlog of information to be transmitted and changing said first and second average signal levels when said backlog crosses a threshold.

2. The method of claim 1 wherein the step of monitoring a backlog of information to be transmitted comprises changing said first and second average signal levels so that said first average signal level is substantially higher than said second average signal level.

3. A method for transferring information between modems, over a communication channel having a near end and a far end, said method comprising the steps of:

transmitting a first plurality of symbols from the near end of the communication channel to the far end of the communication channel with a first average signal level at the near end of the communication channel;

receiving a second plurality of symbols at the near end of the communication channel that are transmitted from the far end of the communication channel with a second average signal level at the far end of the communication channel, said second average signal level being substantially higher than said first average signal level;

using overlapping portions of the communications channel's bandwidth for transmitting and receiving symbols; and at least one of said modems monitoring a backlog of information to be transmitted and changing said first and second average signal levels when said backlog crosses a threshold.

4. The method of claim 3 wherein the step of monitoring a backlog of information to be transmitted comprises changing said first and second average signal levels so that said first average signal level is substantially higher than said second average signal level.

5. The method of claim 3, further comprising the step of adding a tone to said first plurality of symbols.

6. A method for transferring information between modems, over a communication channel having a near end and a far end, said method comprising the steps of:

transmitting a first plurality of symbols from the near end of the communication channel to the far end of the communication channel with a first average signal level at the near end of the communication channel;

receiving a second plurality of symbols at the near end of the communication channel that are transmitted from the far end of the communication channel with a second average signal level at the far end of the communication channel, said second average signal level being substantially higher than said first average signal level;

using the same portions of the communication channel's bandwidth for transmitting and receiving symbols; and at least one of said modems monitoring a backlog of information to be transmitted and changing said first and second average signal levels when said backlog crosses a threshold.

7. The method of claim 6 wherein the step of monitoring a backlog of information to be transmitted comprises changing said first and second average signal levels so that said first average signal level is substantially higher than said second average signal level.

8. The method of claim 6, further comprising the step of adding a tone to said first plurality of symbols.

* * * * *